US009850678B1

(12) United States Patent
Luna et al.

(10) Patent No.: US 9,850,678 B1
(45) Date of Patent: Dec. 26, 2017

(54) TEMPORARY SHELTER FOR AIRCRAFT MAINTENANCE WORKERS

(71) Applicants: Martin H Luna, Dallas, TX (US); Raul Enrique Torres, Charleston, SC (US)

(72) Inventors: Martin H Luna, Dallas, TX (US); Raul Enrique Torres, Charleston, SC (US)

( * ) Notice: Subject to any disclaimer, the term of this patent is extended or adjusted under 35 U.S.C. 154(b) by 0 days.

(21) Appl. No.: 15/411,989

(22) Filed: Jan. 21, 2017

Related U.S. Application Data

(60) Provisional application No. 62/286,340, filed on Jan. 23, 2016.

(51) Int. Cl.
| | |
|---|---|
| *E04H 15/06* | (2006.01) |
| *E04H 15/36* | (2006.01) |
| *E04H 15/56* | (2006.01) |
| *E04H 15/02* | (2006.01) |
| *E04H 15/40* | (2006.01) |
| *B64F 1/00* | (2006.01) |

(52) U.S. Cl.
CPC .............. *E04H 15/06* (2013.01); *B64F 1/005* (2013.01); *E04H 15/02* (2013.01); *E04H 15/36* (2013.01); *E04H 15/40* (2013.01); *E04H 15/56* (2013.01); *Y10S 135/90* (2013.01)

(58) Field of Classification Search
CPC ......... E04H 15/02; E04H 15/03; E04H 15/36; E04H 15/06; E04H 15/40; E04H 15/56; Y10S 135/90; B64F 1/005
USPC ................................................ 135/137, 900
See application file for complete search history.

(56) References Cited

U.S. PATENT DOCUMENTS

| | | | | | |
|---|---|---|---|---|---|
| 2,723,811 | A | * | 11/1955 | Blomquist | B64F 1/005 135/97 |
| 2,931,373 | A | * | 4/1960 | Larson | E04H 15/32 135/116 |
| 3,250,024 | A | * | 5/1966 | Douthitt | G09B 27/02 434/286 |
| 3,525,290 | A | * | 8/1970 | Pelsue | E04H 15/04 135/126 |
| 4,222,400 | A | * | 9/1980 | Reimer | E04H 15/06 135/100 |
| 4,657,299 | A | * | 4/1987 | Mahan | B62D 33/0207 135/88.13 |
| 4,796,649 | A | * | 1/1989 | Tolomay | E04H 15/001 135/116 |

(Continued)

FOREIGN PATENT DOCUMENTS

DE     3332169 A1 *  3/1985  ............. E04H 15/40

*Primary Examiner* — Robert Canfield
(74) *Attorney, Agent, or Firm* — Kenneth L Tolar

(57) ABSTRACT

A temporary shelter for an aircraft maintenance worker includes a base pad having a central opening for surrounding and exposing a repair site on an aircraft. A frame anchored within pockets on the base pad supports a canopy to create a protective enclosure for the worker. A junction box securable to the pad includes a plurality of electrical receptacles and quick-connect, compressed-air fittings on an upper surface for powering various work tools. When the pad is anchored to the aircraft with a pair of retaining straps, the erected canopy provides a temporary shelter that protects a worker from sunlight and inclement weather while providing convenient, uninhibited access to a maintenance site.

8 Claims, 3 Drawing Sheets

(56) References Cited

U.S. PATENT DOCUMENTS

| | | | | |
|---|---|---|---|---|
| 4,959,901 A * | 10/1990 | Parish | ............... | E04H 15/20 |
| | | | | 135/900 |
| 5,339,851 A * | 8/1994 | Miller | ............... | B60P 7/04 |
| | | | | 135/125 |
| 5,611,501 A * | 3/1997 | Crandley | ............... | B64F 1/005 |
| | | | | 150/166 |
| 6,176,450 B1 * | 1/2001 | Bergman | ............... | B64F 1/005 |
| | | | | 150/166 |
| 2005/0044630 A1* | 3/2005 | Danaher | ............... | E04H 15/40 |
| | | | | 5/414 |
| 2012/0017955 A1* | 1/2012 | Zemitis | ............... | E04H 15/44 |
| | | | | 135/96 |
| 2017/0159320 A1* | 6/2017 | Bright | ............... | B64F 1/005 |

\* cited by examiner

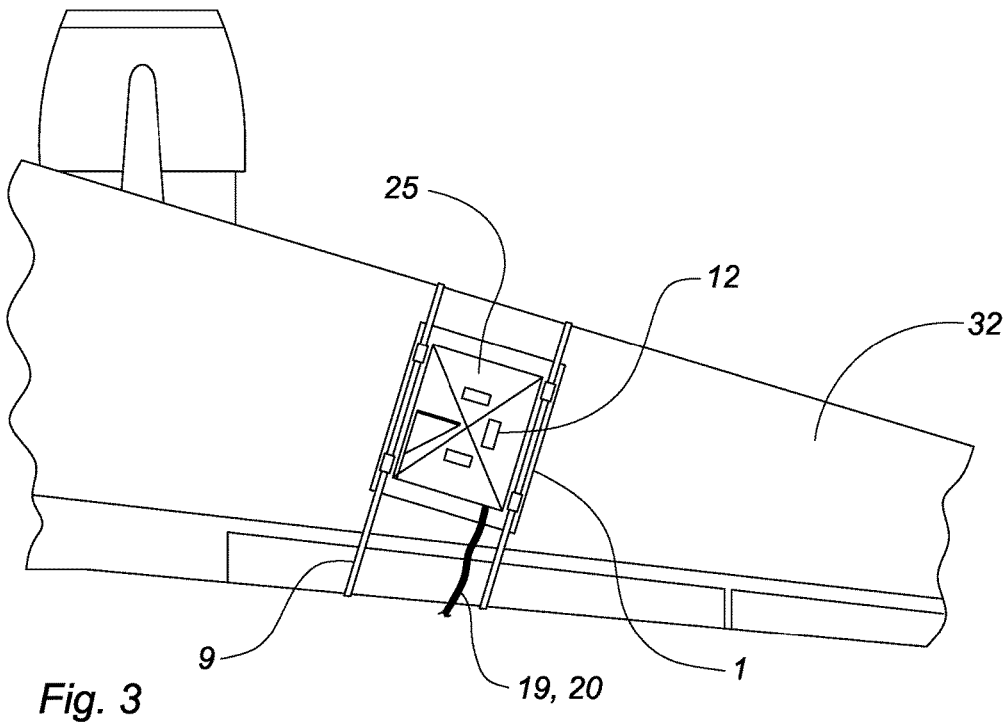
Fig. 3
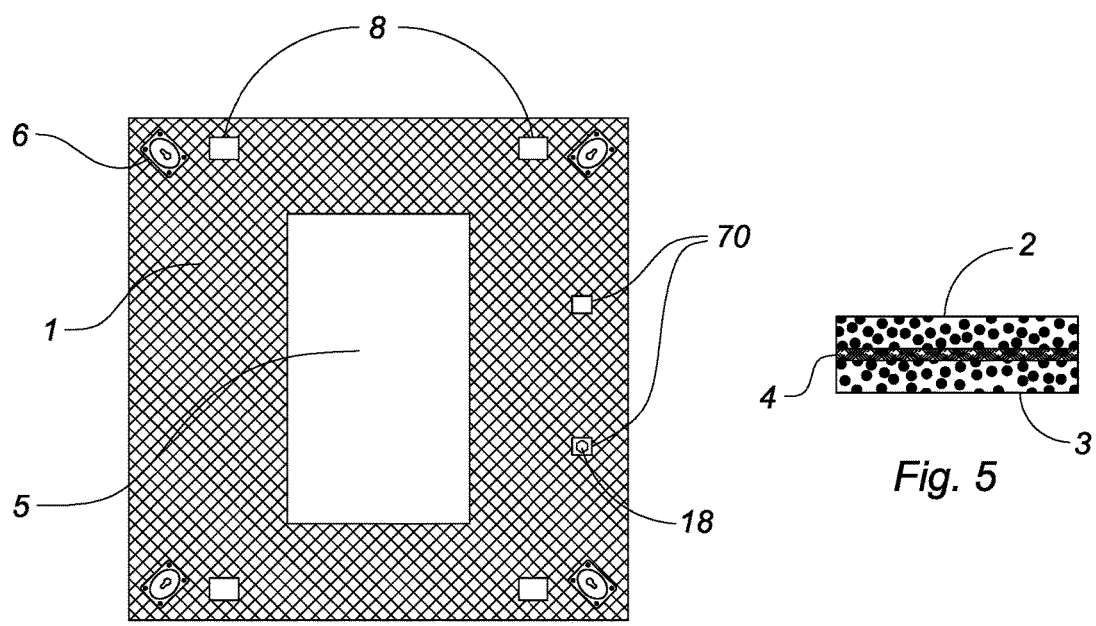
Fig. 4
Fig. 5

TEMPORARY SHELTER FOR AIRCRAFT MAINTENANCE WORKERS

CROSS REFERENCE TO RELATED APPLICATIONS

This application is entitled to the benefit of provisional patent application No. 62/286,340 filed on Jan. 23, 2016, the specification of which is incorporated herein by reference.

BACKGROUND OF THE INVENTION

The present invention relates to a temporary shelter for protecting a maintenance worker from excessive sun exposure or inclement weather when repairing an aircraft outdoors.

DESCRIPTION OF THE PRIOR ART

Often, an aircraft must be repaired outdoors when circumstances prevent it from being transported to a hangar. If so, the worker is usually exposed to intense sunlight and inclement weather that can significantly affect the worker's performance and the quality of the repair. Furthermore, precipitation not only aggravates the worker, but can also seep into the aircraft structure and create latent defects.

Accordingly, there is currently a need for a device that protects an aircraft maintenance worker from inclement weather and intense sunlight when repairing an aircraft. The present invention addresses this need by providing a temporary shelter that can be easily erected on an aircraft fuselage or wing to shield a worker from external elements.

SUMMARY OF THE INVENTION

The present invention relates to a temporary shelter for an aircraft maintenance worker comprising a base pad having a central opening for surrounding and exposing a repair site on an aircraft. A frame anchored within pockets on the base pad supports a canopy to create a protective enclosure for the worker. A junction box securable to the pad includes a plurality of electrical receptacles and quick-connect, compressed-air fittings on an upper surface for powering various work tools. When the pad is anchored to the aircraft with a pair of retaining straps, the erected canopy provides a temporary shelter that protects a worker from sunlight and inclement weather while providing convenient, uninhibited access to a maintenance site.

It is therefore an object of the present invention to provide a temporary shelter for protecting a maintenance worker from sun exposure or inclement weather when repairing an aircraft outdoors.

It is therefore another object of the present invention to provide a temporary shelter for a maintenance worker that protects an aircraft exterior from impact damage by a worker.

Other objects, features, and advantages of the present invention will become readily apparent from the following detailed description of the preferred embodiment when considered with the attached drawings and the appended claims.

BRIEF DESCRIPTION OF THE DRAWINGS

FIG. 3 is a top view of the shelter of FIG. 2.

FIG. 4 is a top, plan view of the base pad.

FIG. 5 is a cross-sectional view of the base pad.

DESCRIPTION OF THE PREFERRED EMBODIMENT

Figure 1:
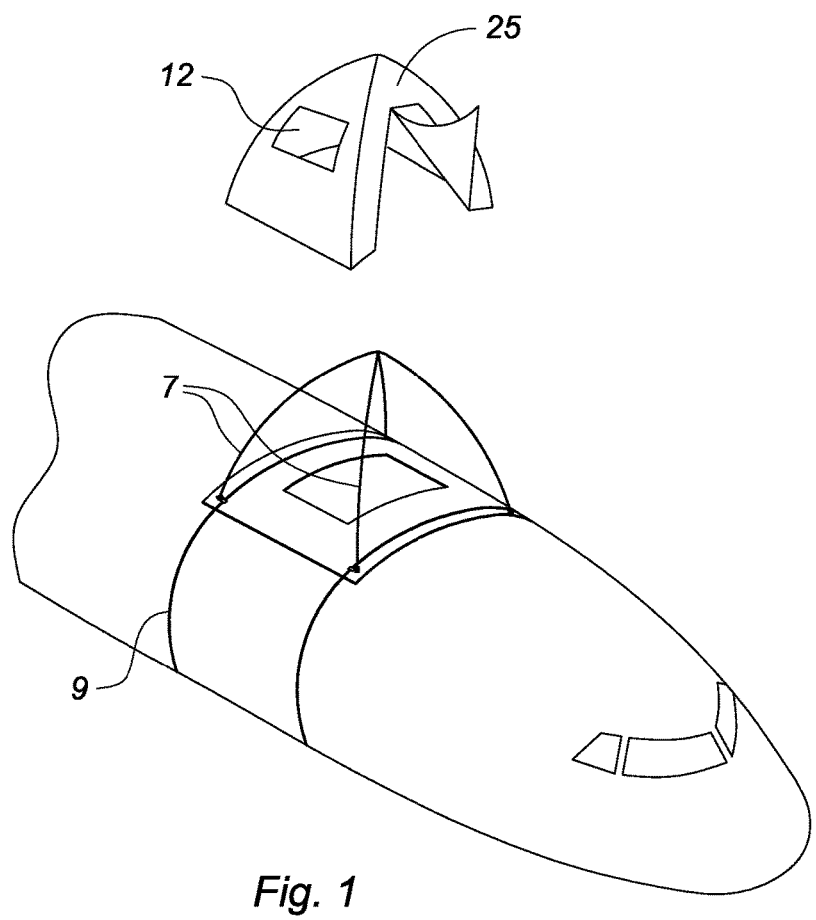
FIG. 1 is a perspective, exploded view of the shelter erected on an airplane fuselage.
Figure 2:
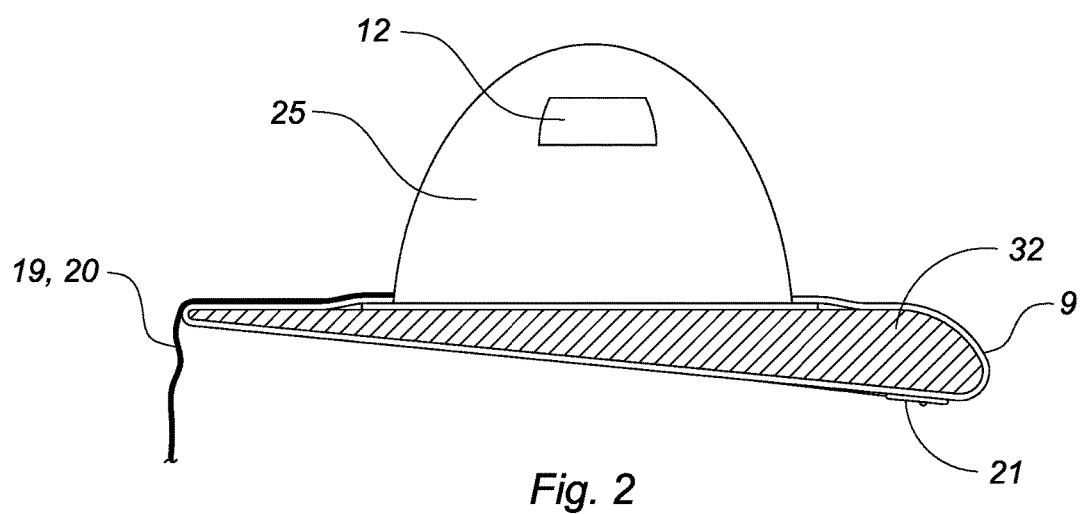
FIG. 2 is a side, plan view of an aircraft wing with the shelter according to present invention erected thereon.
Figure 6:
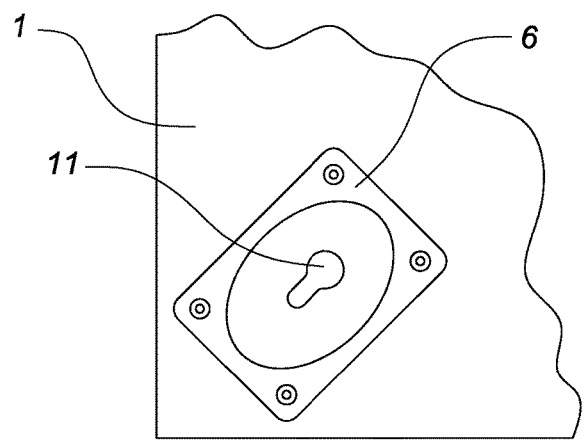
FIG. 6 is an isolated view of the pocket for receiving the frame poles.
Figure 7:
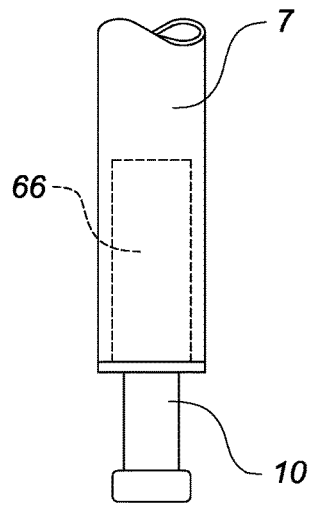
FIG. 7 is an isolated view of a pole key.
Figure 8:
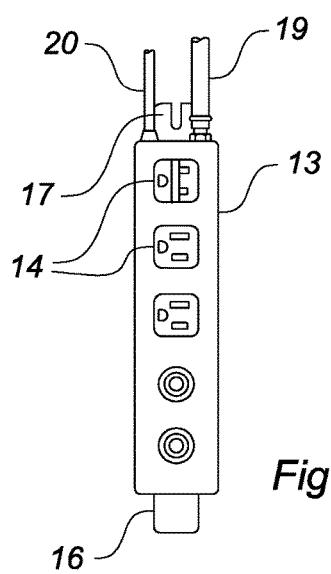
FIG. 8 is an isolated, front view of the electrical box.
Figure 9:
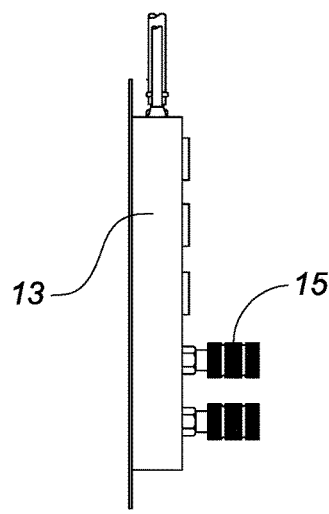
FIG. 9 is an isolated, side view of the electrical box.
Figure 10:
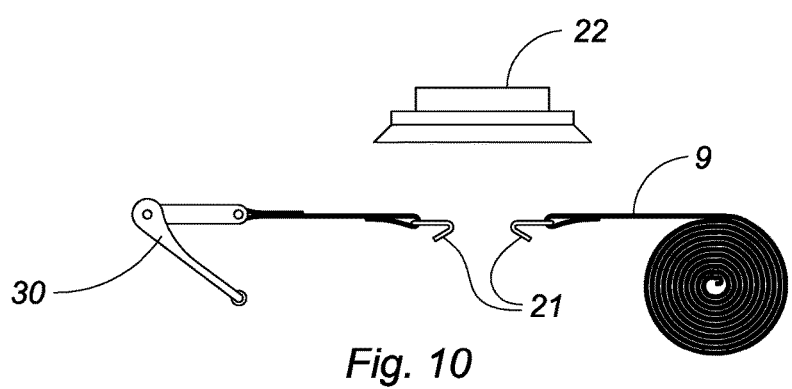
FIG. 10 is an isolated view of a retaining strap and a suction cup.

The present invention relates to a temporary shelter for an aircraft maintenance worker comprising a base pad 1 having rubber, textured upper 2 and lower 3 surfaces with a perforated, metallic core 4 therebetween. The metallic core distributes a worker's weight to prevent damage to the thin, fragile aircraft exterior. The base pad includes a central opening 5 for surrounding and exposing a repair site on an aircraft. At each of four corners of the pad is a pocket 6 that is dimensioned and configured to receive a rod 7 on a canopy support frame, described infra. Adjacent two opposing side edges of the pad are a pair of aligned sleeves 8 for receiving retaining straps 9 that anchor the pad to the aircraft.

The canopy support frame includes a pair of intersecting rods 7 that are bent into an arcuate configuration and anchored within the pad pockets. The two opposing ends of each rod include a receptacle 66 with a key 10 protruding therefrom that releasably locks within a keyed opening 11 in the pocket. The bowed intersecting poles support a canopy 25 having a plurality of flaps 12 positioned about the periphery that are raised to expose window openings if ventilation or additional illumination is desired. The flaps can be releasably secured in the raised position with magnets and mating ferromagnetic plates or similar fasteners. On one side of the canopy is a separable seam that provides access to the interior.

The temporary shelter further includes a junction box 13 having a plurality of electrical receptacles 14 and quick-connect, compressed-air fittings 15 on an upper surface for powering various work tools. At each of two ends of the box is a tab 16, 17 for inserting into a designated collar 70 on the upper surface of the pad. One of the tabs 17 is slotted to receive a bolt 18 on one of the collars to firmly anchor the box to the pad. Adjacent the slotted tab 17 are an incoming air hose 19 for coupling with an air compressor and an electrical cable 20 for coupling with a power source.

The pad is secured to the aircraft with a pair of soft, polyester retaining straps 9 having a zinc-plated hook 21 at each opposing end for gripping a wing 32 component or other similar thin, fixed surface on the fuselage. Alternatively, each hook can be secured to a suction cup 22 to anchor the straps when a suitable fixed surface for the hooks is unavailable.

Accordingly, each strap is passed through one of the pairs of aligned sleeves on the pad, the hooks are secured to a suitable fixed surface and a ratchet handle 30 is reciprocated to anchor the pad to the aircraft. The erected canopy provides a temporary shelter that protects a worker from sunlight and inclement weather while providing convenient, uninhibited access to a maintenance site.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A temporary shelter for an aircraft maintenance worker comprising:
    a base pad having a central opening for surrounding and exposing a repair site on an aircraft exterior;
    a pair of aligned sleeves adjacent two opposing side edges of said base pad;
    a retaining strap passing through said pair of aligned sleeves and secured to the aircraft exterior;
    a pair of intersecting rods bent into an arcuate configuration and anchored to said base pad;
    a canopy superimposed on said pair of intersecting rods for protecting a worker from sunlight and inclement weather while providing convenient, uninhibited access to said repair site.

2. The temporary shelter according to claim 1 wherein said base pad includes a rubber, textured upper surface and a rubber, textured lower surface that provide traction, and a perforated, metallic core between said rubber, textured upper surface and said rubber, textured lower surface that distributes a worker's weight to prevent damage to said aircraft exterior.

3. The temporary shelter according to claim 1 further comprising:
    a key protruding from each of two opposing ends of each of said rods;
    a plurality of pockets on said base pad, each of said pockets dimensioned and configured to receive one of the two opposing ends of each of said rods, each of said pockets having a keyed opening for receiving said key.

4. The temporary shelter according to claim 1 wherein said canopy includes a plurality of flaps thereon that are raised to expose window openings if ventilation or additional illumination is desired.

5. The temporary shelter according to claim 1 wherein said canopy includes a separable seam that provides access to an interior of said canopy when superimposed on said pair of intersecting rods.

6. The temporary shelter according to claim 1 further comprising a junction box removably attachable to said base pad, said junction box having a plurality of electrical receptacles and quick-connect, compressed-air fittings on an upper surface for powering work tools.

7. The temporary shelter according to claim 1 wherein said retaining strap has a zinc-plated hook at each of two opposing ends for gripping a fixed surface on the aircraft exterior.

8. The temporary shelter according to claim 7 wherein said zinc-plated hooks are securable to a suction cup in lieu of the fixed surface on the aircraft exterior.

* * * * *